(12) United States Patent
Reiche

(10) Patent No.: US 6,445,337 B1
(45) Date of Patent: Sep. 3, 2002

(54) METHOD FOR MEASURING THE SPEED OF A VEHICLE

(75) Inventor: Martin Reiche, Konigswinter (DE)

(73) Assignee: Valeo Schalter und Sensoren GmbH, Bietigheim-Bissingen (DE)

( * ) Notice: Subject to any disclaimer, the term of this patent is extended or adjusted under 35 U.S.C. 154(b) by 0 days.

(21) Appl. No.: 09/658,901

(22) Filed: Sep. 11, 2000

(51) Int. Cl.[7] ................................................ G01S 13/60
(52) U.S. Cl. .................... 342/104; 342/116; 342/70; 180/197
(58) Field of Search ................. 180/167, 169, 180/197; 342/104, 116, 117, 174, 70, 71, 72; 303/112, 146, 150, 190, 193; 701/101, 207, 214, 215, 23, 300, 301, 41, 50, 74, 79, 90, 91, 93

(56) References Cited

U.S. PATENT DOCUMENTS

| | | | | |
|---|---|---|---|---|
| 4,346,774 A | * | 8/1982 | Hirota et al. ............... 180/167 |
| 4,366,546 A | | 12/1982 | Tachibana et al. .......... 346/571 |
| 4,414,548 A | * | 11/1983 | Carpenter et al. .......... 342/117 |
| 4,517,566 A | * | 5/1985 | Bryant et al. ............... 342/117 |
| 4,527,160 A | | 7/1985 | Endo et al. .................... 343/8 |
| 4,633,252 A | * | 12/1986 | Bachman et al. ............. 342/99 |
| 4,660,050 A | | 4/1987 | Phillips ....................... 343/753 |
| 5,320,186 A | | 6/1994 | Strosser et al. ................ 172/8 |
| 5,355,717 A | * | 10/1994 | Tanaka et al. ................ 73/105 |
| 5,371,718 A | * | 12/1994 | Shinji et al. .................. 367/91 |
| 5,621,413 A | | 4/1997 | Lempkowski et al. ....... 341/117 |
| 6,236,954 B1 | * | 5/2001 | Jean-Luc et al. ............ 704/142 |

FOREIGN PATENT DOCUMENTS

| | | | |
|---|---|---|---|
| DE | 35 40 426 A 1 | | 5/1986 |
| DE | 42 25 653 A 1 | | 2/1993 |
| DE | 41 29 580 A 1 | | 3/1993 |
| DE | 43 15 091 A 1 | | 11/1993 |
| DE | 19928624 A | * | 1/2001 |
| EP | 1016876 A | * | 7/2000 |
| FR | 2 584 490 | | 1/1987 |
| JP | 01090853 A | * | 4/1989 |

* cited by examiner

Primary Examiner—John B. Sotomayor
(74) Attorney, Agent, or Firm—Paul Vincent

(57) ABSTRACT

The invention concerns a method and a device to measure the speed (v) of a vehicle relative to a road surface. To increase the accuracy of the speed measurement and in order to be able to determine the speed (v) of the vehicle independently of the diameter and the adhesion of a vehicle wheel on the road surface, the invention proposes that the speed (v) of the vehicle is measured directly on the road surface by utilizing the Doppler effect.

22 Claims, 1 Drawing Sheet

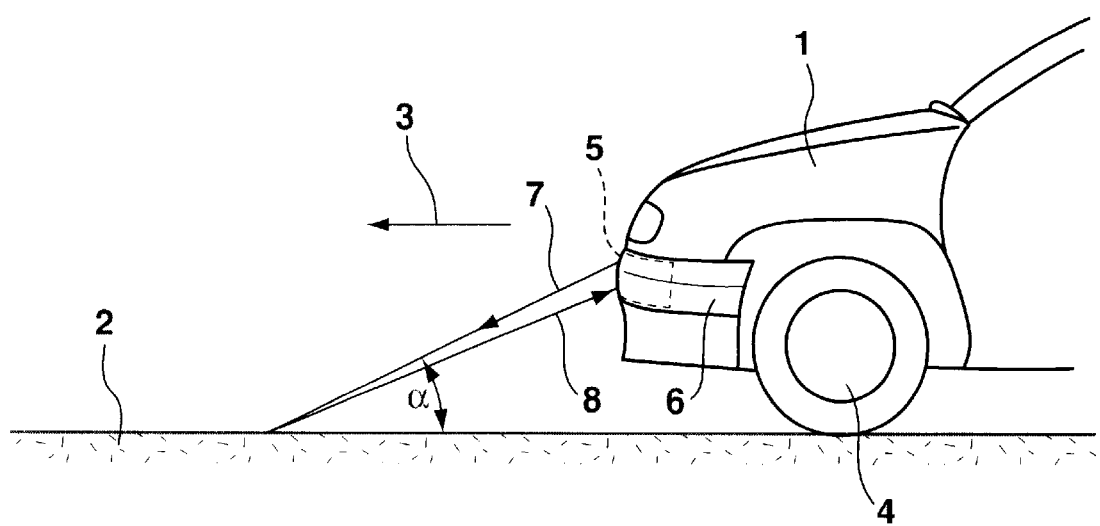

METHOD FOR MEASURING THE SPEED OF A VEHICLE

BACKGROUND

The present invention concerns a method for measuring the speed of a vehicle relative to a road surface.

The invention concerns in addition a device to measure the speed of a vehicle relative to a road surface.

Similar devices for measuring the speed of a vehicle are known from the prior art in various configurations. The known devices customarily employ a method in which the speed measurement is made by observing the rotational frequency of one or several vehicle wheels. Using the average circumference of the wheels, a deduction is made concerning distance covered per unit of time. The recording of rotational frequency is made, for example, by means of an analog tachometer generator, or digitally by means of an incremental inductive transducer.

In dependently of the type of measurement of rotational frequency, the measuring methods known from the prior art reveal two fundamental disadvantages. Firstly, the diameter of the vehicle wheels, and therefore the circumference, varies as a result of the temperature of the wheels. Since the known method for measuring speed assumes constant wheel circumference, a change in wheel circumference causes an erroneous result in the measurement. Secondly, the rolling action of the wheels relative to the road surface, particularly under acceleration and braking, is accompanied by slip, which similarly falsifies the result of the known method of measuring speed.

From the a forementioned disadvantages of the prior art, a task derives for the present invention of creating and developing a method for measuring the speed of a vehicle in such a way that the accuracy of the measurement is increased and the result of the measurement is independent of the diameter of the vehicle wheels and of the adhesion of the vehicle wheels to the road surface.

SUMMARY

To solve this task, the invention proposes that the speed of the vehicle be measured directly at the road surface by utilizing the Doppler effect.

The Doppler effect uses a sending unit to transmit beams at a specific frequency and a receiving unit to receive these beams. The beams can be generated as visual, acoustic or electromagnetic waves. If a relative motion exists between the sending unit and the receiving unit, that is to say, the mutual distance is increasing or decreasing, the receiving unit registers a different frequency than the one transmitted by the sending unit. The difference between the transmit frequency and the receive frequency changes as a result of the Doppler effect, proportionally dependent on the speed of the relative motion between the sending unit and the receiving unit. The speed of the relative motion can be determined from the difference between the transmit frequency and the receive frequency.

In order to measure the speed of a vehicle, the sending unit and the receiving unit are mounted on the vehicle. The sending unit transmits beams in the direction of the road surface. The beams are at least partially reflected from the road surface and the reflected beams are received by the receiving unit. The road surface acts as an imaginary transmitting unit, since it appears to the receiving unit as if the road surface were transmitting the reflected beams. From the difference between the transmit frequency and the receive frequency, the speed, of the vehicle relative to the road surface can be determined.

The method under the invention measures the speed of the vehicle directly at the road surface. Consequently, the accuracy of the measurement can be substantially increased. In addition, the result of the measurement is independent of the diameter and the adhesion of the vehicle wheels, using the process as visualized under the invention.

As an advantage, the speed of the vehicle is also determined indirectly by measuring the rotational frequency of one vehicle wheel and determining the speed of the vehicle indirectly from the rotational frequency and the circumference of the wheel.

Under an advantageous further development of the invention, it is proposed that the speed measured directly at the road surface is transmitted to a central computer on the vehicle. The directly measured vehicle speed can then be processed further. The additional processing includes, for example, displaying the speed in an appropriate display unit on the instrument panel or inclusion of the speed in open and closed loop control of vehicle conditions, for example, vehicle speed or vehicle stability.

As an advantage, the directly determined speed of the vehicle is compared with the indirectly measured speed of the vehicle as part of the additional processing. Preferably, the slip of one vehicle wheel is determined from the comparison of the directly measured speed of the vehicle with the indirectly measured speed of the vehicle. Since the indirectly measured speed is dependent on the rotational frequency of the vehicle wheels, the slip of one vehicle wheel can be determined from the comparison of the indirectly measured speed with the directly measured speed of the vehicle in the case of acceleration or braking. The information about slip allows conclusions to be made about the adhesion of the wheel or about the prevailing coefficient of adhesion, which is heavily dependent on the nature of the road surface and on environmental conditions. The information about the coefficient of adhesion can be included, for example, in vehicle traction control to limit engine torque or vehicle speed.

If the vehicle is not being accelerated or braked and the vehicle is being driven on a straight road, slip at the wheels is normally negligibly small. Under these conditions a deduction can be made about the actual diameter of a vehicle wheel from the comparison of the indirectly measured vehicle speed with the directly measured vehicle speed. This can be combined with a diagnosis of tire pressure and a warning can be given in the case of tire pressure that is too low or too high. For this reason, in accordance with a preferred configuration of the invention, it is proposed that the circumference of one vehicle wheel and consequently the tire pressure of the wheel be determined from the comparison of the indirectly measured vehicle speed with the directly measured vehicle speed.

In accordance with a preferred further development of the present invention, the speed of the vehicle is measured directly by means of a Doppler radar. A Doppler radar transmits a signal which is created as electromagnetic waves. In the case of the signal, this means preferably a continuously unmodulated signal.

In accordance with a preferred further development of the invention, it is proposed that electromagnetic waves are projected onto the road surface by means of the Doppler radar, the emitted electromagnetic waves are reflected by the road surface, the reflected electromagnetic waves are received by the Doppler radar and the speed of the vehicle is determined from the difference between the transmission frequency and the reception frequency.

As an advantage, the electromagnetic waves are transmitted at an angle of inclination ($\alpha$) onto the road surface, whereby the speed of the vehicle (v) is determined from the equation:

$$v = k(1 - f_S/f_E) \cos \alpha, \text{ with a constant } k,$$

transmission frequency $f_S$; and reception frequency $f_E$.

The constant (k) is customarily the speed of sound (c). The intention is to install a Doppler radar in the forward area of the vehicle, in the center facing the direction of travel. The primary emitting direction of the Doppler radar antenna is pointing onto the road surface at the angle of inclination ($\alpha$) relative to the horizontal. Since the calculation of vehicle speed, among other things, is dependent on the angle of inclination ($\alpha$), an angle of inclination of 0° would be ideal, mathematically considered, to eliminate this dependency. However, with an angle of inclination of 0°, the signal would be traveling approximately parallel to the road surface and there would be no reflection of the electromagnetic waves. Consequently, a compromise must be made in the selection of the angle of inclination ($\alpha$) between the accuracy of the measurement method on the one hand and the intensity of the reflection on the other hand.

In contrast to light, electromagnetic waves can only be focused by expending considerable effort. The dimensions and costs of the antennae for the Doppler radar increase with the degree of focusing, and consequently for the Doppler radar itself. For the method envisioned by the invention, the electromagnetic waves are focused, for example, by means of a so-called patch antenna, (for example, 3 dB limits at ±7°, 10 patches).

A less intensely focused beam does not contact the road surface at more or less a single point, but illuminates a section of the road surface. Illuminating one section has the benefit that the probability of detecting a reflective point on the road surface is increased. That allows a decrease in the angle of inclination of the Doppler radar, which in turn reduces the influence of the angle of inclination ($\alpha$) on the calculation of speed, and the accuracy of the measurement method can be increased.

Different locations on the illuminated surface section are at a different distance to the Doppler radar. Depending on the minimum and maximum distance to the illuminated surface section, there is a maximum and minimum angle of inclination ($\alpha_{max}$ and $\alpha_{min}$). The electromagnetic waves received consequently do not demonstrate any uniform reception spectrum, but a frequency spectrum whose minimum and maximum frequencies are dependent on the minimum and maximum angle of inclination ($\alpha_{max}$ and $\alpha_{min}$). The spectrum of different frequencies of the electromagnetic waves received by the Doppler radar is averaged, filtered and/or weighted under a preferred version of the invention before the speed of the vehicle is measured. In this way, the spectrum of receive frequencies can be compressed to one frequency which matches a specific average angle of inclination ($\alpha$).

In accordance with an advantageous further development of the invention, it is proposed that pulse modulated electromagnetic waves are transmitted onto the road surface by means of the Doppler radar, that the transmitted pulse modulated electromagnetic waves are reflected by the road surface, the reflected pulse modulated electromagnetic waves are received by the Doppler radar, that the speed of the vehicle is determined from the difference between the transmit frequency and the receive frequency and that the propagation time of pulse modulated electromagnetic waves is determined from the time delay between the transmit pulse and the receive pulse. The method envisioned under the invention is expanded in this way to a pulse Doppler method. In order to generate the pulse waves, the transmitter signal is modulated in its amplitude. Vehicle speed is determined from a comparison of the transmitter carrier frequency with the receiver carrier frequency. From the spectrum of different receive frequencies, those frequencies can be filtered out, for example, which result from received electromagnetic waves which demonstrate a specific propagation time and thus have covered a specific distance from the road surface to the Doppler radar receiving unit. By limiting the propagation time of the electromagnetic waves received, the number of waves to be utilized can be limited to a specific measurement range. All other receive frequencies are ignored in the direct determination of vehicle speed.

The distance between the Doppler radar and the road surface is preferably determined from the propagation time of the pulse modulated electromagnetic waves. By limiting the valid propagation time range, the permissible range of the angle of inclination ($\alpha$) can be narrowed down.

A propagation time gate provides an example of a simple implementation of this filter function. In a preferred version of the invention, with the help of a propagation time gate, only those pulse modulated electromagnetic waves received whose propagation time lies within a specified propagation time range are used to determine the speed of the vehicle. A form of focusing the beams received can be achieved by means of the additional propagation time measurement. Measuring propagation time represents a meaningful alternative or supplement to a highly focusing Doppler radar antenna.

Under an advantageous further development of the invention, it is proposed that the distance of the vehicle from objects on the road can be determined by means of the Doppler radar. Preferably the distance of the vehicle to other vehicles, lane markings or similar objects is determined to make maneuvering the vehicle easier, particularly parking the vehicle. This additional function of the Doppler radar as an aid to parking can be implemented at minimal additional cost. Conversely, it would also be conceivable for radar parking aids already installed in vehicles to be used for measuring speed. This would be a decisive advantage of this type of radar parking aid compared with other types of parking aids, such as for example, ultrasonic parking aids, and could increase acceptance of radar parking aids among vehicle buyers in spite of the higher purchase price.

An additional task of the present invention consists of creating and developing a device to measure the speed of a vehicle of the type described at the beginning in such a way that the accuracy of the speed measurement is increased and the result is independent of the diameter of the vehicle wheels and their adhesion to the road surface.

To solve this task the invention proposes, starting with the device of the type named at the beginning, that the device has primary means to measure the speed of the vehicle directly on the road surface utilizing the Doppler effect.

Advantageously the vehicle has secondary means to measure the rotational frequency of one vehicle wheel and to determine the speed ($v_{indirect}$) of the vehicle indirectly from the rotational frequency and the circumference of the wheel.

The primary means are advantageously designed as a Doppler radar. The Doppler radar preferably has a transmitting unit to beam electromagnetic waves onto the road surface and a receiving unit to receive the electromagnetic waves reflected from the road surface.

Under a preferred version, the Doppler radar is located in the forward area of the vehicle in the direction of travel. The Doppler radar is aligned advantageously in such a way that the electromagnetic waves strike the road surface at an angle (α) in the direction of travel in front of the vehicle.

Under a preferred development of the invention, the Doppler radar has means to focus the electromagnetic waves emitted. The means to focus the electromagnetic waves emitted are, for example, constructed as a focusing antenna. It is also conceivable that the means to focus the waves emitted modulate the amplitude of the transmit carrier signal in pulse form and determine the pulse propagation time of the pulse modulated electromagnetic waves received. The electromagnetic waves to be considered in measuring vehicle speed can be limited to those waves whose propagation time lies within a specified propagation time range. By this means, also the electromagnetic waves emitted can be focused. Alternatively, or additionally, the Doppler radar has means to filter, weight and/or average the frequencies of the electromagnetic waves received.

BRIEF DESCRIPTION OF THE DRAWING

A preferred example of the implementation of the present invention is explained in greater detail below using the drawing which shows:

FIG. 1 is a pictorial representation of the forward area of a vehicle which has a device as envisioned under the invention for measuring the speed of the vehicle.

DETAILED DESCRIPTION

In FIG. 1, a vehicle 1 is shown which is traveling on a road surface 2 in a direction 3 at a specific speed v. The rotational frequency of a wheel 4 of the vehicle 1 is being measured. From the rotational frequency and the circumference of the wheel 4 the speed $v_{indirect}$ of the vehicle 1 can be determined indirectly.

In addition, the vehicle 1 has primary means with which the speed v of the vehicle 1 is measured directly on the road surface 2 utilizing the Doppler effect. The primary means is constructed as a Doppler radar. The means 5 is located in the forward area of the vehicle 1 in the direction of travel 3. More precisely, the primary means 5 is located on the longitudinal axis of the vehicle 1 inside the bumper 6. The means 5 has a transmitting unit (not shown) to beam electromagnetic waves 7 onto the road surface 2 and a receiving unit (not shown) to receive the electromagnetic waves 8 reflected from the road surface 2. The bumper 6 of the vehicle 1 has an area permeable to electromagnetic waves, preferably an opening through which the electromagnetic waves 7, 8 can reach the road surface 2 from the transmitting unit or reach the receiver from the road surface 2, respectively.

The means 5 is arranged in such a way that the electromagnetic waves 7 strike the road surface 2 in the direction of travel 3 in front of the vehicle 1 at an angle α. When the vehicle 1 is moving relative to the road surface 2, the frequency $f_E$ of the electromagnetic waves 8 received by the receiving unit shifts as a result of what is known as the Doppler effect. A proportional relationship exists between the difference between the transmit frequency $f_S$ and the receive frequency $f_E$ and the speed v of the vehicle relative to the road surface 2. In this way, the speed v of the vehicle 1 relative to the road surface 2 can be determined from the difference of the transmit frequency $f_S$ and the receive frequency $f_E$.

From a comparison of the speed v of the vehicle 1 measured directly using the primary means 5 with the speed $v_{indirect}$ of the vehicle 1 measured indirectly over the vehicle wheel 4, the slip of the wheel 4 of the vehicle 1 can be determined. Additionally, in driving situations in which the slip at the wheels 4 is normally negligibly small, a deduction can be made about the actual diameter of the vehicle wheel 4 from the comparison of the directly measured vehicle speed v with the indirectly measured vehicle speed $v_{indirect}$. This can be combined with a diagnosis of tire pressure, and a warning can be given in the case of tire pressure that is too low or too high.

What is claimed is:

1. A method of measuring the speed of a vehicle relative to a road surface, characterized in that the speed (v) of the vehicle is measured directly at the road surface by utilizing the Doppler effect, and an actual circumference of a wheel of the vehicle and a tire pressure of the wheel are determined from the comparison of an indirectly measured speed of the vehicle with the directly measured speed of the vehicle.

2. The method according to claim 1, characterized in that a rotational frequency of a wheel of the vehicle is measured and the indirect speed of the vehicle is determined indirectly from a rotational frequency and an expected circumference of the wheel.

3. The method according to claim 1, characterized in that the speed (v) measured directly at the road surface is relayed to a central computer in the vehicle.

4. The method according to claim 1 wherein the speed (v) of the vehicle is measured directly by primary means located on a longitudinal axis of the vehicle inside a front bumper.

5. The method according to claim 1, characterized in that a slip of a wheel of the vehicle is determined from a comparison of a second indirectly measured speed of the vehicle with a second directly measured speed of the vehicle.

6. The method according to claim 1, characterized in that the speed (v), of the vehicle is measured directly by means of a Doppler radar.

7. The method according to 6, characterized in that a distance between the vehicle and an object on the road toward a front of the vehicle comprising one of another vehicle, lane markings and the like is determined by means of the Doppler radar.

8. A method of measuring the speed of a vehicle relative to a road surface, characterized in that the speed (v) of the vehicle is measured directly at the road surface by utilizing one Doppler radar unit wherein electromagnetic waves are emitted at an angle (α) onto the road surface in front of the vehicle in the direction of travel, whereby the speed (v) of the vehicle is determined by:

$$v = k(1 - f_S/f_E) \cos \alpha, \text{ with a constant } k,$$

a transmit frequency $f_S$ of the electromagnetic waves emitted from the Doppler radar unit; and a receive frequency $f_E$ of the electromagnetic waves reflected from the road surface to the Doppler radar unit.

9. The method according to claim 8, characterized in that the electromagnetic waves received demonstrate a spectrum of different frequencies, ($f_E$), which is one of averaged, filtered and weighted before the speed (v) of the vehicle is determined.

10. The method according to claim 8, further comprising:
mounting the one Doppler radar unit on a longitudinal axis of the vehicle inside a front bumper.

11. A method of measuring the speed of a vehicle relative to a road surface, characterized in that the speed (v) of the vehicle is measured directly at the road surface by utilizing the Doppler effect whereby pulse-modulated electromagnetic waves modulated in their amplitude are transmitted onto the road surface by a Doppler radar, the pulse-modulated electromagnetic waves are reflected from the road surface, the reflected pulse-modulated electromagnetic waves are received by the Doppler radar, the speed (v) of the vehicle is determined from the difference between the transmit frequency ($f_S$) and the receive frequency ($f_E$) and the propagation time of the pulse-modulated electromagnetic waves is determined from the time delay of the transmit pulses to the receive pulses.

12. The method according to claim 11, characterized in that the distance between the Doppler radar and the road surface is established from the propagation time of the pulse-modulated electromagnetic waves.

13. The method according to claim 12, characterized in that only the pulse-modulated electromagnetic waves received, whose propagation time lies within a specified propagation range, are used in determining the speed (v) of the vehicle.

14. The method according to claim 11, further comprising:

mounting the Doppler radar on a longitudinal axis of the vehicle inside a front bumper.

15. A device to measure the speed (v) of a vehicle relative to a road surface, characterized in that the device possesses:

primary means constructed as a Doppler radar to measure the speed (v) of the vehicle directly at the road surface by utilizing the Doppler effect, the Doppler radar located in the forward area of the vehicle in the direction of travel and located in such a way that the electromagnetic waves strike the road surface in the direction of travel in front of the vehicle at an angle of inclination ($\alpha$); and means for determining a distance between the vehicle and an object on the road comprising one of another vehicle, lane markings and the like using the Doppler radar.

16. The device according to claim 15, characterized in that the vehicle includes secondary means to measure the rotational frequency of a wheel of the vehicle and to indirectly determine the speed ($v_{indirect}$) of the vehicle from the rotational frequency and the circumference of the wheel.

17. The device according to claim 15 wherein the Doppler radar is located on a longitudinal axis of the vehicle inside a front bumper.

18. The device according to claim 15, characterized in that the Doppler radar possesses a sending unit to emit electromagnetic waves onto the road surface and a receiving unit to receive the electromagnetic waves reflected from the road surface.

19. The device according to claim 15, further comprising:

means for determining an indirectly measured speed of the vehicle; and means for determining an actual circumference of a wheel of the vehicle and a tire pressure of the wheel from the comparison of an indirectly measured speed of the vehicle with the directly measured speed of the vehicle.

20. The device according to claim 15 wherein the Doppler radar emits pulse-modulated electromagnetic waves modulated in their amplitude.

21. The device according to claim 15, characterized in that the Doppler radar possesses means to focus the emitted electromagnetic waves.

22. The device according to claim 15, characterized in that the Doppler radar possesses means to one of filter, weight and average the frequencies ($f_E$) of the electromagnetic waves received.

* * * * *